US007706313B2

(12) United States Patent
Sebire et al.

(10) Patent No.: US 7,706,313 B2
(45) Date of Patent: Apr. 27, 2010

(54) METHOD AND ARRANGEMENT FOR IMPLEMENTING MINIMUM ACTIVITY DURING DISCONTINUOUS TRANSMISSION

(75) Inventors: Benoist Sebire, Tokyo (JP); Harri Jokinen, Hiisi (FI)

(73) Assignee: Nokia Corporation, Espoo (FI)

( * ) Notice: Subject to any disclaimer, the term of this patent is extended or adjusted under 35 U.S.C. 154(b) by 533 days.

(21) Appl. No.: 10/587,820

(22) PCT Filed: Jan. 30, 2004

(86) PCT No.: PCT/FI2004/000049

§ 371 (c)(1), (2), (4) Date: Apr. 24, 2007

(87) PCT Pub. No.: WO2005/074309

PCT Pub. Date: Aug. 11, 2005

(65) Prior Publication Data

US 2007/0274338 A1 Nov. 29, 2007

(51) Int. Cl.
*G08C 17/00* (2006.01)
*H04J 3/02* (2006.01)

(52) U.S. Cl. ....................... 370/311; 370/445; 370/350; 455/67.11; 455/127.1; 455/522

(58) Field of Classification Search .................. 370/311
See application file for complete search history.

(56) References Cited

U.S. PATENT DOCUMENTS 6,038,238 A 3/2000 Jokinen et al.

OTHER PUBLICATIONS

3G TS 26.093 V4.0.0 (Dec. 2002), Section A5.1.1.*
3GPP TSG-RAN Working Group 1 Meeting No. 11; San Diego, USA, Feb. 28-Mar. 3, 2000; Tdoc R1-00-0302.
3GPP TSG RAN Working Group 1 Meeting No. 10; China, Beijing, Jan. 18-21, 2000; Tdoc R1-00-0075.

* cited by examiner

*Primary Examiner*—Huy D Vu
*Assistant Examiner*—Maria L Sekul
(74) *Attorney, Agent, or Firm*—Alfred A. Fressola; Ware, Fressola, Van Der Sluys & Adolphson LLP

(57) ABSTRACT

A method and a device are considered for implementing minimum activity during discontinuous transmission in a telecommunication connection used to carry a service. The service is allowed to involve transmitting upper-level scheduled silence-breaking transmissions at predetermined regular intervals during otherwise silent periods. There is determined (407, 408, 409) a maximum length of a silent period that is longer than the predetermined regular intervals between upper-level scheduled silence-breaking transmissions. A Layer 2 entity of a protocol stack observes (411) the occurrence of silent periods and transmits (412) a dummy block over the telecommunication connection if the length of an observed silent period reaches said maximum length without an upper-level scheduled silence-breaking transmission having been transmitted.

10 Claims, 2 Drawing Sheets

METHOD AND ARRANGEMENT FOR IMPLEMENTING MINIMUM ACTIVITY DURING DISCONTINUOUS TRANSMISSION

CROSS REFERENCE TO RELATED APPLICATIONS

This application is for entry into the U.S. national phase under §371 for International Application No. PCT/FI2004/000049 having an international filing date of Jan. 30, 2004, and from which priority is claimed under all applicable sections of Title 35 of the United States Code including, but not limited to, Sections 120, 363 and 365(c).

TECHNICAL FIELD

The present invention concerns the technical field of scheduling and producing discrete transmission bursts over a radio interface in a cellular radio network. Especially the invention is related to optimising the so-called minimum activity transmissions during temporary breaks in the transmission of payload data.

BACKGROUND OF THE INVENTION

Discontinuous transmission, generally referred to as DTX, is a general designation of all concepts where a temporary break in payload data to be transmitted causes a corresponding break in an otherwise continuous or regular stream of scheduled transmissions. The most typical example is the application of DTX to a telephone connection. As a first approximation, the participant of a point-to-point telephone call is only speaking for one half of the time, because during the remaining time he is silent and listening to the speaker at the other end. If a battery-driven mobile telephone is adapted to only produce full-scale transmissions when its user is actually speaking, transmission capacity in the telephone network can be saved and battery life extended considerably.

However, it is not advantageous to mute all radio transmissions even during periods when payload data is not available for transmission. For purposes like link quality estimation, channel estimate updating, transmission power control and synchronisation it is advantageous to maintain a thinned-out schedule of brief transmissions in the absence of payload data. Also a speech codec that is not receiving actual speech data should nevertheless regularly receive so-called silence descriptors that it uses for updating the spectrum of artificially generated background noise, also known as comfort noise.

Concerning conventional speech-based DTX arrangements we may make a simplified statement according to which it was on the responsibility of the speech codecs to generate the necessary silence time transmissions: during an observed break in speech a transmitting speech codec modelled the continuous background noise and used it to generate the silence descriptors. The so-called Layer One (L1) mechanisms, which are responsible for low-level radio interface functionalities like channel estimation and receiver synchronisation, could rely on the silence descriptor transmissions coming often enough to be used also for the other purposes. For example an AMR (Adaptive MultiRate) speech codec standardised for the GSM (Global System for Mobile telecommunications) cellular radio system transmits a silence descriptor once in every 160 milliseconds.

However, the advent of 3GPP (Third Generation Partnership Project) has changed the picture. The roles of the RAN (Radio Access Network) and the CN (Core Network) are now more clearly separated, so that the RAN is only supposed to offer the transport channel for whatever service there may exist between a mobile station and a core network. Different kinds of core networks may utilise the same RAN for communicating with mobile stations, and from a certain core network there may be connections to mobile stations through different kinds of RANs. The radio interface between the RAN and a mobile station may be completely identical regardless of whether the Iu interface on the other side of the RAN operates with a packet-switched or a circuit-switched core network.

According to the 3GPP approach, the RAN does not necessarily even know, what kind of services go through the "transport channel tubes" maintained in the RAN. The lack of such knowledge in the RAN has necessitated defining certain functions that the RAN is supposed to apply independently, in order to support L1 functionalities such as synchronisation management and link quality estimation.

The standard 3GPP TS 45.008, where TS comes from Technical Specification, requires dummy blocks belonging to L2 (layer two) to be sent over the radio interface to satisfy the needs of L1 functionalities during silent periods, if PDTCH or FLO is in use. Of these, PDTCH means a Packet Data Traffic Channel and FLO means Flexible Layer One, which is a way of redefining certain L1 functionalities in a parameterised way so that their optimisation for specific purposes can be made case by case through choices made by higher levels in the OSI (Open System Interconnection) model. However, regardless of any of PDTCH or FLO being used to carry a speech service, considerations related to the operation of the speech codecs require the transmission of silence descriptors independently of said dummy blocks. The result may be a situation where, during a break in the transmission of payload data, both dummy blocks and silence descriptors are transmitted. Their transmission moments might coincide in time in an ideal case, but since their generation processes are independent of each other, such temporal coincidence would be unlikely. A major part of the advantages of DTX could be lost, because these two partly redundant processes might easily produce an excessive number of silent-time transmissions.

SUMMARY OF THE INVENTION

It is an objective of the present invention to present a method and an arrangement that will prevent the advantages of DTX from being lost in a situation like that described above. A further objective of the invention is to provide a flexible method and a corresponding arrangement for satisfying the needs of both a service to be transported and the L1 level functionalities during a break in the otherwise regular transmission of payload data.

The objectives of the invention are achieved by substituting the inflexibly defined dummy block transmission method, if any, with a set of rules that cover the possible channel assignment and interleaving cases and define the interval between consecutive dummy block transmissions to be sufficiently long, and additionally take into account that no dummy block needs to be sent if a silence descriptor or similar was transmitted first before said interval between consecutive dummy block transmissions expired.

The method according to the invention comprises:

determining a maximum length of a silent period that is longer than a predetermined regular interval between upper-level scheduled silence-breaking transmissions transmitted by a service that involves transmitting upper-level scheduled silence-breaking transmissions, and at a certain layer of a protocol stack governing communication over a telecommunication connection, observing the occurrence of silent periods and transmitting a dummy block over the telecommunication connection if the length of an observed silent period reaches said maximum length without an upper-level scheduled silence-breaking transmission or payload data having been transmitted.

The invention applies also to an arrangement, comprising:

means for implementing Layer 1, 2 and 3 functionalities of a protocol stack governing communication over a telecommunication connection, and as a part of said means, a dummy block functionality adapted to transmit dummy blocks within the telecommunication connection according to certain rules.

Said arrangement is characterised in that the dummy block functionality comprises a dummy block timing part adapted to determine a maximum length of a silent period that is longer than a predetermined regular interval between upper-level scheduled silence-breaking transmissions transmitted by a service that involves transmitting upper-level scheduled silence-breaking transmissions, and to trigger the transmission of a dummy block over the telecommunication connection if the length of an observed silent period reaches said maximum length without an upper-level scheduled silence-breaking transmission or paylod data having been transmitted.

The channel assignment and interleaving cases that come into question are:

full-rate dedicated basic physical shared channel (DBPSCH/F) with 4 bursts rectangular interleaving (pertinent to PDTCH and FLO)

fill-rate dedicated basic physical shared channel (DBPSCH/F) with 8 bursts diagonal interleaving (pertinent to FLO)

half-rate dedicated basic physical shared channel (DBPSCH/H) with 4 bursts rectangular interleaving (pertinent to PDTCH and FLO)

half-rate dedicated basic physical shared channel (DBPSCH/H) with 4 bursts diagonal interleaving (pertinent to FLO).

According to the invention, each of these possible cases is associated with a corresponding dummy block transmission rule, which essentially defines the non-activity period that necessitates a dummy block to be transmitted to be longer than the typical period that will occur between two consecutive silence descriptors or other kind of upper-level scheduled silence-breaking transmissions. Most advantageously the definitions of said non-activity periods are such that together with the time it takes to transmit the dummy blocks they constitute a timing cycle, a multiple of which matches a reporting period defined for the radio access network.

BRIEF DESCRIPTION OF THE DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

Figure 1:
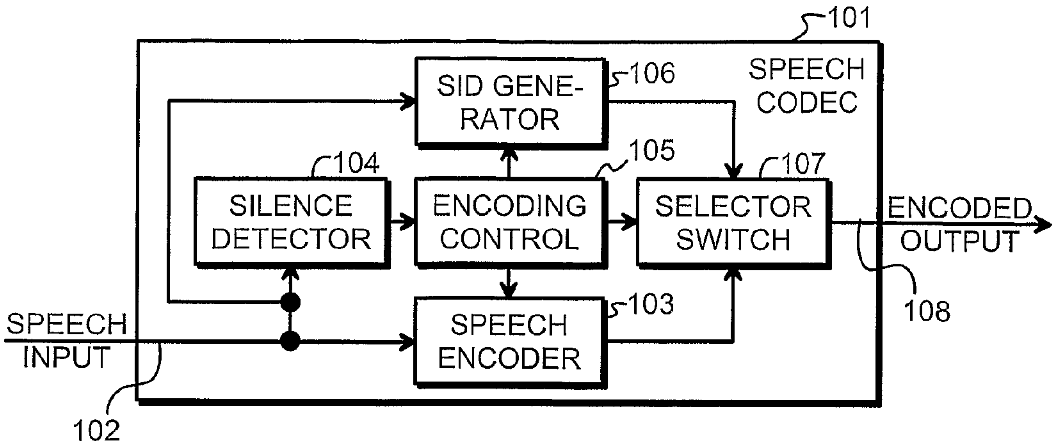
FIG. 1 illustrates a speech codec.

FIG. 1 is a schematic illustration of certain parts of a speech codec 101 used for source encoding in a communications connection conveying speech. An input line 102 conducts the speech signal into a speech encoder 103. From the input line 102 there is also a connection to a silence detector 104, the task of which is to detect moments when the signal on the input line 102 does not contain significant amounts of an actual speech signal. The silence detector 104 is adapted to announce its detection results to a control block 105, which in turn is adapted to respond to detected silence by instructing a SID generator 106 to generate silence descriptors, known as SIDs. The control block 105 also sets a selection switch 107 so that it couples either the SIDs or encoded speech from the speech encoder 103 onto an output line 108, according to whether silence was detected or not.

Figure 2:
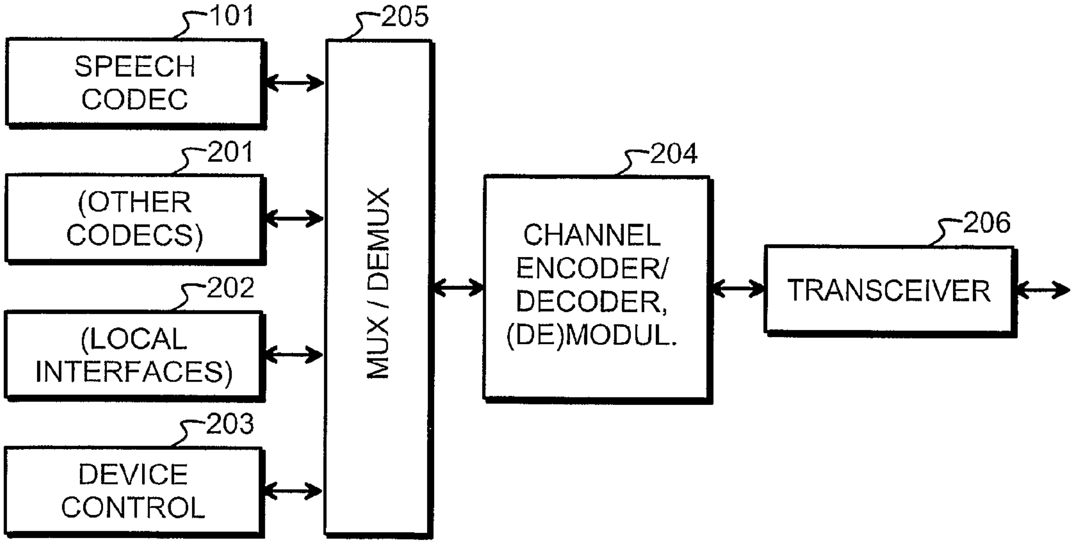
FIG. 2 illustrates an architecture of a communications device.

FIG. 2 illustrates how the speech codec 101 is located in the schematically shown architecture of a communications device, which may be e.g. a mobile station of a cellular radio system. Together with the speech codec 101 there may be other codecs 201, such as video codecs and data codecs. There may also be one or more local interfaces 202, through which the communications device accepts source encoded data from other devices and through which the communications device also outputs received encoded data for eventual decoding somewhere else. Typically there is also a device control block 203 that transmits and receives signalling messages that concern the operation of the communications device. The codecs 101 and 201 as well as the local interfaces 202 and control block 203 are coupled to a channel encoding and decoding and modulating/demodulating unit 204 through a multiplexer/demultiplexer 205. Coupled to the channel encoding and decoding and modulating/demodulating unit 204 there is a transceiver 206 that takes care of long distance transmitting and receiving of signals.

Figure 3:
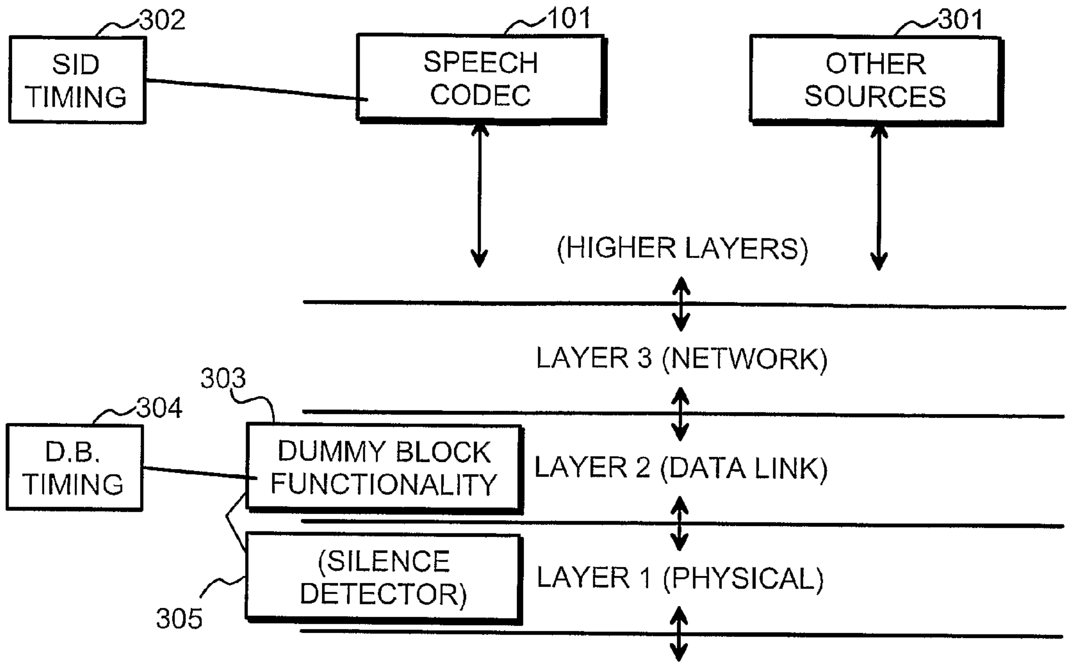
FIG. 3 illustrates the existence of certain functions related to the invention and FIG. 4 illustrates a method according to an embodiment of the invention.

FIG. 3 is an alternative schematic approach to the structure and operation of a communications device, oriented according to the layered OSI model. The three lowest layers in the OSI model are the physical layer (Layer 1), the data link layer (Layer 2) and the network layer (Layer 3). Above these there may be a varying selection of Layers 4 to 7 (not shown in FIG. 3). Data sources, such as the speech codec 101 and others 301, communicate with the higher layers. As a part of the speech codec 101 there exists a SID timing functionality 302, which has been programmed to respond to detected silence by starting to send silence descriptors and sending them regularly according to a certain predefined timetable, until the silent period ends.

As a part of Layer 2 there is a dummy block functionality 303, which has been programmed to respond to detected silence in an outgoing connection by starting to send dummy blocks. The timing aspects that trigger and govern the sending of said dummy blocks will be sent are determined in a dummy block timing part 304 of the dummy block functionality 303. It is not obligatory to place the dummy block functionality 303 exactly at Layer 2; it may also be located or at least involve parts that are located on other layers, like the optional implementation of a silence detector 305 in FIG. 3. It is only important that the dummy block functionality 303, together with possibly associated parts thereof, is capable of detecting a silent period in a communication connection and capable of responding to a detected silent period by commencing and maintaining the transmission of dummy blocks or similar minimum transmission activity according to certain time rules that are described in more detail below.

FIGS. 2 and 3 can be read also as schematic descriptions of a base station in a RAN of a cellular radio system, by taking into account that the typical base station only contains the functionalities of Layers 1, 2 and 3; e.g. the speech codec is not a feature of a base station.

According to the invention, there is a specific relationship between the ways in which the SID timing functionality 302 and the dummy block functionality 303 govern the generation of the respective transmissions. Firstly, in order to avoid redundantly triggering the transmission of both SIDs and dummy blocks, the dummy block functionality 303 must be adapted to recognise also SIDs as "silence-breaking" transmissions. In other words, when the dummy block functionality 303 is monitoring the activity within an outgoing communication connection and notices an apparently silent period, it must reset measuring the length of the silent period whenever it encounters an outgoing SID in that communication connection.

Secondly, the length of a silent period that according to the dummy block functionality 303 should trigger the transmission of a dummy block must be longer than the interval between two consecutive SIDs determined by the SID timing functionality 302. How much longer, depends mainly on what is the frequency at which transmissions are needed to maintain synchronisation and other Layer 1 aspects. Additionally it is advantageous if the timing of dummy block transmissions can be adapted to other timing aspects of the communications system, such as a reporting period.

As an example we will consider certain time values that are typical to 3GPP. An AMR standardised for 3GPP will react to a detected silent period by first transmitting the so-called first SID and thereafter transmitting SID updates at intervals of 160 ms. A first criterion for avoiding redundant transmission during the silent period is therefore that the length of the silent period that triggers the transmission of a dummy block must be longer than 160 ms. On the other hand, a reporting period has the length of 480 ms, so the timing cycle of dummy block transmission or a multiple thereof should preferably equal that value.

Transmitting a dummy block on a dedicated basic physical shared channel at full rate (DBPSCH/F) takes four consecutive TDMA frame periods if 4 bursts rectangular interleaving is used (pertinent to PDTCH and FLO), and eight consecutive TDMA frame periods if 8 bursts diagonal interleaving is used (pertinent to FLO only). Correspondingly transmitting a dummy block on a dedicated basic physical shared channel at half rate (DBPSCH/H) takes four TDMA frame periods that in the actual stream of TDMA frame periods occur with one frame period intervals there-between, due to the nature of the half-rate channel. The usage of TDMA frame periods on a DBPSCH/H remains the same regardless of whether 4 bursts rectangular interleaving is used (pertinent to PDTCH and FLO) or whether 4 bursts diagonal interleaving is used (pertinent to FLO only).

Based on the values above, we may present the following rules for transmitting dummy blocks. In said rules, SACCH stands for the known Slow Associated Control Channel.

Rule 1: when 4 bursts rectangular interleaving is used on DBPSCH/F (PDTCH and FLO), a L2 dummy block shall be sent after every silent period of 44 TDMA frames, excluding SACCH frames (i.e. 220 ms).

Rule 2: when 8 bursts diagonal interleaving is used on DBPSCH/F (FLO), a L2 dummy block shall be sent after every silent period of 40 TDMA frames, excluding SACCH frames (i.e. 200 ms).

Rule 3: when 4 bursts rectangular interleaving is used on DBPSCH/H (PDTCH or FLO), or when 4 bursts diagonal interleaving is used on DBPSCH/H (FLO), a L2 dummy block shall be sent after every silent period of 20 TDMA frames, excluding SACCH frames (i.e. 200 ms).

It is easy to see that said rules cause the timing cycles to match the 480 ms length of the reporting period in the following way.

Instead of having fixed rules programmed to the dummy block functionality, it is possible to make the whole minimum transmission activity controllable by parameters provided by a Layer 3 entity or an even higher-level controlling functionality. Parameterised control of that kind may include control over the maximum allowed non-activity period before transmitting a dummy block, as well as a definition for the number of dummy blocks sent after each non-activity period.

According to Rule 1, when 4 bursts rectangular interleaving is used on DBPSCH/F (PDTCH and FLO) we have: silence (220 ms)+1 dummy block (20 ms)+silence (220 ms)+1 dummy block (20 ms), which together equals 1 reporting period (480 ms).

According to Rule 2, when 8 bursts diagonal interleaving is used on DBPSCH/F (FLO) we have: silence (200 ms) +1 dummy block (40 ms)+silence (200 ms)+1 dummy block (40 ms), which together equals 1 reporting period (480 ms)

According to Rule 3, when 4 bursts rectangular interleaving is used on DBPSCH/H (PDTCH or FLO), or when 4 bursts diagonal interleaving is used on DBPSCH/H (FLO), we have: silence (200 ms)+1 dummy block (40 ms)+silence (200 ms)+1 dummy block (40 ms), which together equals 1 reporting period (480 ms).

We may designate the 104 TDMA frame periods that constitute a reporting period with ordinal numbers from 0 to 103. This numbering is exemplary only and does not refer to any actually used TDMA frame numbers; here we simply assume for the purpose of example that the last speech (or other actual payload) transmission was made immediately before TDMA frame period number 0. Of said 104 TDMA frame periods, TDMA frame periods number 12, 38, 64, and 90 or 25, 51, 77 and 103 are assigned to SACCH; the other group constitutes the so-called idle or search frames. In the absence of any SID transmissions, the rules laid out above will cause dummy block transmissions to take place during certain TDMA frame periods in the following way. Note that in the following the TDMA frame period numbers refer to the truly sequential numbering thereof at the radio interface; a half-rate channel will only occupy every second TDMA frame period in the sequential stream of TDMA frame periods at the radio interface.

According to Rule 1, when 4 bursts rectangular interleaving is used on DBPSCH/F (PDTCH and FLO), dummy block transmissions take place during TDMA frame periods 47-50 and 99-102.

According to Rule 2, when 8 bursts diagonal interleaving is used on DBPSCH/F (FLO), dummy block transmissions take place during TDMA frame periods 43-50 and 95-102.

According to Rule 3, when 4 bursts rectangular interleaving is used on DBPSCH/H (PDTCH or FLO), or when 4 bursts diagonal interleaving is used on DBPSCH/H (FLO), there are two alternatives for the TDMA frame periods during which dummy block transmissions take place, depending on which half of the corresponding full-rate channel the half-rate channel occupies. On a half-rate channel occupying the first, third, fifth etc. TDMA frame period of the corresponding full-rate channel, the dummy block transmissions take place during TDMA frame periods 43, 45, 47 and 49; as well as 95, 97, 99 and 101. On a half-rate channel occupying the second, fourth, sixth etc. TDMA frame period of the corresponding full-rate channel, the dummy block transmissions take place during TDMA frame periods 44, 46, 48 and 50; as well as 96, 98, 100 and 102.

Figure 4:
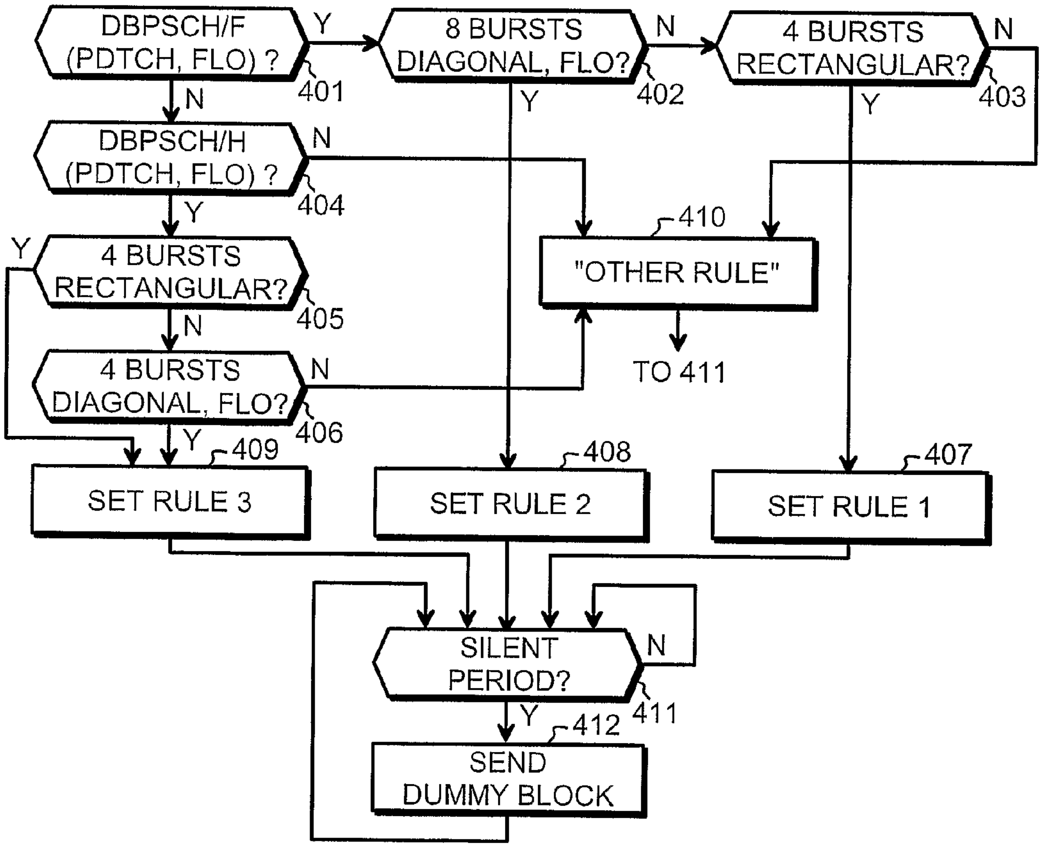

FIG. 4 illustrates schematically the operation of a dummy block functionality 303 according to an embodiment of the invention. The deduction chains through states 401, 402, 403, 404, 405 and 406 simply represent classifying the used communications channel and interleaving scheme so that one of the rules outlined above can be applied. A positive finding at state 403 causes Rule 1 to be adopted at state 407, while a positive findings at state 402 causes the adoption of Rule 2 at state 408. The adoption of Rule 3 at state 409 may result from a positive finding at either one of states 405 or 406. If none of states 402, 403, 405 and 406 gives a positive result, some other rules like the conventional rules for applying dummy block transmission are adopted at state 410. After the appropriate rule has been adopted, the actual monitoring and dummy block transmission, if required, are accomplished in the loop consisting of states 411 and 412. Of this, state 411 only gives a positive result after a silent period has been detected and the silent period has continued up to the maximum limit defined in the rule adopted at one of states 407, 408 or 409.

The time values given above are only exemplary and refer mainly to DTX combined with speech and the known form of certain existing 3GPP standards known at the date of writing this description. More generally we might say that the invention is applicable to all arrangements where a service to be carried may involve silent periods, and some (but typically not all) of such services may additionally involve regularly interrupting silent periods by service-generated silence descriptors or SIDs. We may present the following scheme for determining the timing for dummy block transmission:

Designate the time it takes to transmit a dummy block with A.

Designate the empty time interval between two consecutive dummy block transmissions with B.

Select the smallest possible value for B that fulfils the conditions

B is longer than the silent period between two consecutive SIDs generated by a service to be carried and an integral multiple of (A+B) equals a reporting period or similar cyclically occurring longer time interval applied in the system, where "integral multiple" covers (A+B), 2(A+B), 3(A+B) and so on with increasing integral multipliers.

In determining the times it should be noted that many commonly used time definitions refer to the time at the Layer 2 level. At the 3GPP radio interface (Layer 1), the length of a TDMA frame period is approximately 4.615 ms (exactly speaking, 60/13 ms), the TDMA frame periods follow each other as a continuous stream, and every $13^{th}$ TDMA frame period is reserved to SACCH. At Layer 2, the length of a frame period is 5 ms, so that corresponding to each sequence of 13 TDMA frame periods at Layer 1 there are only 12 frame periods at Layer 2. Schematically this can be thought as if the TDMA frame periods of Layer 1 and frame periods of Layer 2 otherwise matched each other, but the clock and frame period counter at Layer 2 were stopped always for the duration of the Layer 1 TDMA frame period reserved to SACCH.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method, comprising:

determining in a communications device a maximum length of a silent period that is longer than predetermined regular intervals between upper-level scheduled silence-breaking transmissions transmitted over a telecommunications connection by a service that involves transmitting upper-level scheduled silence-breaking transmissions, and at a layer of a protocol stack governing communication over said telecommunication connection, observing the occurrence of silent periods and transmitting a dummy block over the telecommunication connection when the length of an observed silent period reaches said maximum length without an upper-level scheduled silence-breaking transmission or payload data having been transmitted, wherein said layer is lower in said protocol stack than layers that produce said upper-level scheduled silence-breaking transmissions, wherein said determining a maximum length of a silent period comprises:

classifying the telecommunication connection according to channel type and interleaving type in said communications device, and determining the maximum length of a silent period according to the classification of the telecommunication connection.

2. A method according to claim 1, wherein said determining a maximum length of a silent period comprises:

classifying the telecommunication connection into either a dedicated basic physical shared channel at full rate, or a dedicated basic physical shared channel at half rate, and into either a 4 bursts rectangular interleaving type, an 8 bursts diagonal interleaving type or a 4 bursts diagonal interleaving type in said communications device, and determining the maximum length of a silent period according to the following rules:

for 4 bursts rectangular interleaving and dedicated basic physical shared channel at full rate, a maximum length of a silent period is a first number of time division multiple access frames, excluding slow associated control channel frames, for 8 bursts diagonal interleaving and dedicated basic physical shared channel at full rate, a maximum length of a silent period is a second number of time division multiple access frames, excluding slow associated control channel frames, for 4 bursts rectangular interleaving and dedicated basic physical shared channel at half rate and for 4 bursts diagonal interleaving and dedicated basic physical shared channel at half rate, a maximum length of a silent period is a third number of time division multiple access frames, excluding slow associated control channel frames.

3. A method according to claim 2, wherein said first number is 44, said second number is 40, and said third number is 20.

4. A method according to claim 1, further comprising controlling in said communications device at least one of maximum length of an observed silent period before transmitting a dummy block and a number of dummy blocks sent after an observed silent period through a parameterised command from an upper layer in said protocol stack.

5. An apparatus comprising:

a dummy block functionality configured to transmit dummy blocks from a communications device within a telecommunication connection according to rules, said dummy block functionality comprising a dummy block timing part configured to determine a maximum length of a silent period that is longer than a predetermined regular interval between upper-level scheduled silence-breaking transmissions transmitted by a service that involves transmitting upper-level scheduled silence-breaking transmissions, and to trigger the transmission of a dummy block over the telecommunication connection when the length of an observed silent period reaches said maximum length without an upper-level scheduled silence-breaking transmission or payload data having been transmitted;

wherein the dummy block functionality comprises a layer of a protocol stack that is lower in said protocol stack than layers that produce said upper-level scheduled silence-breaking transmissions, and wherein said determining a maximum length of a silent period comprises classifying the telecommunication connection according to channel type and interleaving type in said communications device, and determining the maximum length of a silent period according to the classification of the telecommunication connection.

6. An apparatus according to claim 5, further comprising a signal codec configured to act as a source of information to be transmitted over the telecommunication connection, and also configured to transmit said upper-level scheduled silence-breaking transmissions at predetermined regular intervals during otherwise silent periods in a signal to be encoded in the signal codec.

7. An apparatus according to claim 5, wherein said dummy block functionality forms part of a module in said communications device for implementing Layer 1, 2 and 3 functionalities of a protocol stack governing communication over the telecommunication connection.

8. An apparatus comprising:

means for transmitting dummy blocks from a communications device within a telecommunication connection according to rules, said means for transmitting comprising means for determining a maximum length of a silent period that is longer than a predetermined regular interval between upper-level scheduled silence-breaking transmissions transmitted by a service that involves transmitting upper-level scheduled silence-breaking transmissions, and means for triggering the transmission of a dummy block over the telecommunication connection when the length of an observed silent period reaches said maximum length without an upper-level scheduled silence-breaking transmission or payload data having been transmitted;

wherein said means for triggering the transmission of a dummy block over the telecommunication connection comprises a layer of a protocol stack that is lower in said protocol stack than layers that produce said upper-level scheduled silence-breaking transmissions, and wherein said determining a maximum length of a silent period comprises classifying the telecommunication connection according to channel type and interleaving type in said communications device, and determining the maximum length of a silent period according to the classification of the telecommunication connection.

9. An apparatus according to claim 8, further comprising a signal codec adapted to act as a source of information to be transmitted over the telecommunication connection, and also adapted to transmit said upper-level scheduled silence-breaking transmissions at predetermined regular intervals during otherwise silent periods in a signal to be encoded in the signal codec.

10. An apparatus according to claim 8, wherein said means for transmitting dummy blocks forms part of a means in said communications device for implementing Layer 1, 2 and 3 functionalities of a protocol stack governing communication over the telecommunication connection.

* * * * *